United States Patent [19]

Handtmann et al.

[11] Patent Number: 4,618,913
[45] Date of Patent: Oct. 21, 1986

[54] ELECTRICAL CAPACITOR INCLUDING A QUENCHER GAS ADDITIVE

[75] Inventors: Dieter Handtmann, Sindelfingen; Egon Mossburger, Stuttgart; Herbert Förster, Schorndorf, all of Fed. Rep. of Germany

[73] Assignee: Robert Bosch GmbH, Stuttgart, Fed. Rep. of Germany

[21] Appl. No.: 709,785

[22] Filed: Mar. 11, 1985

[30] Foreign Application Priority Data

Mar. 30, 1984 [DE] Fed. Rep. of Germany ....... 3411793

[51] Int. Cl.$^4$ .......................... H01G 4/22; H01B 3/48
[52] U.S. Cl. ..................................... 361/315; 252/567
[58] Field of Search ............... 361/314, 315, 323, 324, 361/327, 433 W; 252/567, 570, 571, 575, 576, 578, 579

[56] References Cited

U.S. PATENT DOCUMENTS

| | | | |
|---|---|---|---|
| 3,812,407 | 5/1974 | Nose et al. | 361/315 |
| 4,142,223 | 2/1979 | Shaw | 252/567 X |
| 4,327,395 | 4/1982 | Yagitani et al. | 361/314 X |
| 4,348,713 | 9/1982 | Grahame | 361/314 X |
| 4,440,971 | 4/1984 | Harrold | 252/571 X |

FOREIGN PATENT DOCUMENTS 2704458 10/1977 Fed. Rep. of Germany .
2084798A 4/1982 United Kingdom .

*Primary Examiner*—Donald A. Griffin
*Attorney, Agent, or Firm*—Michael J. Striker

[57] ABSTRACT

An electrical capacitor of a non-impregnated, self-curing type includes a roll or wound body provided with metallic layers. Interspaces between the windings of the roll are filled with a gaseous or vaporous additive substance of a polyatomic hydrocarbon compound which is free of halogens and whose ionization potential is less than the ionization potential of at least a part of decomposition products of dielectric substance of the capacitor. The additive substances makes it possible that in an electric arc of a disruptive breakdown in the dielectric material of the capacitor the charge is taken over by positive ions of the decomposition product and subsequent clusters of breakdowns are substantially prevented. In addition, the additive substances absorb during a breakdown UV photons so that the emission of secondary electrons on the metallic lining is avoided. The additive substances should be substantially free of sulfur and/or nitrogen to avoid the generation of detrimental acids or lyes which would result in the presence of unavoidable residuals of water in the dielectric material and might attack the metallic lining of the capacitor.

10 Claims, No Drawings

ELECTRICAL CAPACITOR INCLUDING A QUENCHER GAS ADDITIVE

BACKGROUND OF THE INVENTION

The present invention relates in general to an electrical capacitor, preferably a non-impregnated, self-curing capacitor which includes a roll of a dielectric paper and/or plastic foil provided with metal layers applied on the foil preferably by evaporation in vacuum, a housing enclosing the roll and a polyatomic gaseous or vaporous additive medium of a hydrocarbon compound enclosed in the housing to fill the interspaces between the metal layers of the roll.

A capacitor of this kind is known for example from the German publication No. 2,704,458. In this publication, an electrical capacitor is described whose wound body or roll is impregnated by means of a base liquid and with a mixture of two additives of which one consists of a halogenic liquid on basis of toluene or other compound which can be tolerated in a capacitor and which has electrically negative vapors at a high pressure. Such electronegative gaseous additives are capable of absorbing electrons and hence exhibit a quenching effect. The electronegative gases however have no effect on positive ions.

A similar arrangement of an electric capacitor is known from the British Pat. No. 2,084,798 describing an electric capacitor of metallized polypropylene films in which the wound body or roll is also impregnated by electronegative gas or by mixtures of electronegative gas and air and/or nitrogen. The application of the additives medium is made by means of filling oil which is saturated with the gaseous additive medium.

SUMMARY OF THE INVENTION

A general object of the present invention is to provide an improved capacitor of the aforedescribed kind which has the advantage of effectively preventing ionization processes and electric breakdowns.

More particularly, it is an object of the invention to provide such an improved capacitor in which the so-called breakdown pockets in the roll do not occur and consequently any loss of capacity caused by such breakdown pockets is substantially avoided.

The objects of this invention are attained on the one hand by the absorption of ultraviolet photons by which the emission of secondary electrons on the lining of the capacitor is prevented and on the other hand by the take-over of the load of positive ions which result during a breakdown. In a breakdown channel due to thermal decomposition of the dielectric material there result particularly hydrogen and low molecular saturated and non-saturated carbohydrates as well as CO and $CO_2$. By a suitable selection of additive materials, namely of those which possess a first ionization potential which is less than the ionization potential of at least a part of a decomposition product of the dielectric material, especially less than the ionization potential of hydrogen, it is achieved that the additional molecules of the positive ions take over the charging. The polyatomic molecules are neutralized on the lining without emitting further photons.

The additive materials in the capacitor of this invention have the additional advantage that also the fractions of the quenching molecules of the additive material still possess a quenching effect. This quality is essential inasmuch due to the strong overpressure and high temperatures during or immediately after a breakdown in the dielectric material of the capacitor an after diffusion of quenching molecules toward the point of breakdown is hindered or made impossible and in the immediate vicinity of the breakdown point substantially only fractions of the quenching molecules are available.

The additive materials in the capacitor of this invention are peferably selected in such a manner as to be compatible with all components of the capacitor. Especially the additive material must not attack the self-curing thin metal layers for example of zinc of aluminum in the presence of in practice unavoidable water residuals and must not damage the dielectric foil of polypropylene for example and also the remaining component parts of the capacitor. Moreover, such additive materials are supposed to be applied in the housing of the capacitor and in the rolled body with a low content of water and are to be made easily volatile in order to achieve the desired distribution in the air spaces between the metallized layers on the dielectric foil. It is of particular advantage when the additive materials are also free of sulfur and nitrogen because the latter admixtures in connection with water form either acids or bleaching solutions which might damage the dielectric of the capacitor, the metallic layers, installed component parts and the like. It has been proved as advantageous to add between 4 to 8 milligrams of the additive materials of this invention per square centimeter of the upper surface of the wound body or roll of the capacitor. The application of the additive material of this invention in the capacitor is preferably made in a liquid form immediately before the closing of the housing of the capacitor because the volatile components of the additives during further processing of the capacitor after the closure of the housing are not diffused.

The novel features which are considered as characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

The additive materials applied to the capacitor of this invention substantally eliminate ionization processes and electrical breakdowns in the wound body of the capacitor, especially in the role of the metallized plastic foil, such as a metallized polypropylene foil. The application of the additive materials of this invention is particularly effective when the metallized roll is not impregnated by liquid or solid materials. In the latter case the ionization processes and electric breakdowns especially at different breakdown pockets occur earlier than in the case of impregnated rolls. It is of particular importance that the additive medium be applied in the hollow spaces at the end of the wound body or roll where at the end of the winding process due to the released winding tension and due to the insertion of covering foils larger gaps are generated than in the interior of the wound body.

The use of polyatomic organic gases in the additive media for preventing permanent discharges is in principle known from self-quenching Geiger-Miller counting tubes. Inspite of the fact that different conditions resulting already from the geometrical differences between Geiger-Miller tubes and capacitors are present, such as the spacing between electrodes in Geiger-Miller counting tubes of about 1 cm, whereas in the capacitor of several microns only, surprisingly the additive media are effective even for a high energetic process in a minimum space of the breakdown channel. In the wound body of the capacitor such quenching gases prevent after electric breakdowns the ignition of adjoining sequential breakdowns which cause the so-called breakdown pockets and the concomitant impairment of the electric quality of the capacitor. In the preferred embodiment of this invention, the additive medium is toluen and xylene which are used in advantage for the metallized foils of polypropylene. Suitable are also additive media of benzene, acetone, ethylalcohol, propane, propylene butane and chemically similar materials. During a breakdown in the wound body of the capacitor there result in the electric arc a cloud of electrons and positive ions as well as energetic radiation. Especially the ultraviolet radiation and the electrons ignite the adjoining electric breakdowns which are enhanced by the present ions and electrons containing plasma. For quenching such chain-like discharging processes, polyatomic gases or vapors of hydrocarbon compounds are used. These compounds absorb ultraviolet photons, thus preventing the emission of secondary electrons on the metallic lining of the capacitor. The additive media of this invention do not become ionized by elastic collision with electrons but receive only higher rotational and vibrational energy. Moreover, the additive media of this invention take over the charge from at least a part of positive ions resulting during a breakdown. The decomposition products which result in a breakdown channel due to thermal decomposition of the dielectric foil and as the case may be of the impregnating agent, are primarily hydrogen, low molecular saturated and nonsaturated hydrocarbons as well as CO and $CO_2$. The first ionizing potential of the additive media of this invention that means the ionizing potential for setting free the first electrons is less than the first ionizing potential of at least a part of decomposition products, especially less than 10 to 11 electron volts. In this connection it should be considered that the first ionizing potential be always less than the ionizing potential of hydrogen with 13.5 electron volts.

For the absorption of ultraviolet photons, that means with regard to the prevention of emission of secondary electrons on the metallized lining of the capacitor, it is essential that during the neutralization of the quenching gas ions on the lining these molecules be brought only into a short lived excited condition which does not lead to the emission of photons but to dissociation of the molecules of the quenching gas ions. The additive materials for the dielectric foil of the capacitor of this invention are suitable particularly polyatomic hydrocarbon compounds which are free of sulfur, nitrogen or halogens. Compounds which contain the latter substances have the property that at least the fragments of such compounds which in accordance with this invention are desirable because of their quenching quality, in the presence of unavoidable residuals of water would exhibit detrimental effects on parts of the capacitor, especially on the metal layer thereof.

In one embodiment of the capacitor of this invention a round roll of eight microns thick polypropylene foil provided with Zn layers has been wound up to a capacity of 2 microfarads. The terminal part of the wound body consists of 30 windings of non-metallized foil of polycarbonate and as a closure has served a cast resin filling in a synthetic container. The application of the additive substance has been made immediately before the closing of the container by wetting the outer surface of the roll with toluene in the amount of 6 milligrams of toluene per square centimeter related to the upper surface of the roll or wound body.

After a comparative permanent voltage test between the capacitor of this invention and a conventional capacitor, it has been found that the roll which has been wetted by toluene was subject to an average loss of capacity of only 0.5% whereas a group of conventional capacitors has a capacity loss 3.5%. In a subsequent check of several rolls or wound bodies in the capacitor of this invention it was found that the latter was subject to substantially lower number of electric breakdowns and no clusters or pockets of breakdown points were discovered.

As mentioned before, the application or pouring of the additive substance in the active range of the wound body of the capacitor is to be made immediately before the closure or sealing of the housing and the like of the capacitor. The supply of the additive substance is carried out preferably by feeding a definite amount of the additive substance in liquid phase into the housing of the capacitor. In a modification, the additive substance can be supplied together with the liquid or solid filling agent or together with the impregnation substance for the capacitor. The additive substance is admixed and dispersed in the filling or impregnation substances before their application in the capacitor housing. In this manner the quenching molecules diffuse in the filling or impregnating substance and subsequently diffuse in the active range of the wound body. As a filling substance for the capacitor serve preferably cast resins or filling oils or mixtures of the two substances.

In another embodiment of this invention the additive quenching substances are supplied in the capacitor in such a manner that the outer upper surface of the wound body is wetted with the liquid additive substance or the wound body is impregnated with the quenching gas during the vaporous phase of the additive substance. Similarly as in the preceding example, the two last mentioned possibilities must be carried out immediately before the closure of the capacitor housing and under consideration of a certain overflow of the quenching gas inasmuch the additive substances are easily volatile and it may happen that they do not remain in the housing in a sufficient quantity. Also in the before-mentioned possibilities for feeding the additive substances in the capacitor housing, the feeding of a certain surplus of excessive amount of additive gas may be of advantage for the compensation of diffusion losses. In this connection it will be mentioned that conventional residuals of dissolving agents of insulating or covering foils whose vapors act as quenching gas and which take place in substances in the interior of the capacitor, are insufficient to act as the additive substances according to this invention in order to achieve the desired effect.

By virtue of the feeding of the additive substances (quenching gases) according to this invention in the interspaces in the wound body of the capacitor, especially at the end of the wound or rolled body, the loss of capacity caused by pockets or clusters of breakdown points is substantially reduced. This advantage is conditional to the fact that through the quenching gases the ignition of sequential electrical breakdowns in the vicinity of once occurring disruptive breakdown in the dielectric substance of the capacitor is prevented.

It will be understood that each of the elements described above, or two or more together, may also find a useful application in other types of constructions differing from the types described above.

While the invention has been illustrated and described as embodied in a specific example of a wound capacitor, it is not intended to be limited to the details described, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical capacitor, preferably a non-impregnated, self-curing capacitor comprising a roll of a dielectric paper and/or plastic foil provided with metal layers applied thereon preferably by evaporation in vacuum, a housing enclosing the roll, a polyatomic additive substance in gaseous phase enclosed in the housing to fill interspaces between the metal layers of the roll, said additive substance including a hydrocarbon compound free of halogens and having a first ionization potential which is less than the ionization potential of at least a part of a decomposition product of said dielectric paper and/or plastic foil, and said additive substance being selected from a group consisting of toluene, xylene, benzene, acetone, ethyl alcohol, propane, propylene and butane.

2. An electrical capacitor as defined in claim 1, wherein said first ionization potential is less than 10 through 11 electron volts.

3. An electrical capacitor as defined in claim 1, wherein said additive substance is free of sulfur.

4. An electrical capacitor as defined in claim 3, wherein said additive substance is free of nitrogen.

5. An electrical capacitor as defined in claim 1, wherein the quantity of said additive substance supplied in the capacitor housing corresponds to at least 4 milligrams per square centimeter, preferably between 4 to 8 milligrams per square centimeter of the upper surface of said roll.

6. An electrical capacitor as defined in claim 1, wherein the dielectric material of the roll is polypropylene foil and said additive substance is toluene or xylene applied on the polypropylene dielectric.

7. An electrical capacitor as defined in claim 1, wherein said additive substance is supplied in liquid phase into said housing immediately before its closure.

8. An electrical capacitor as defined in claim 7, wherein outer surface of said roll of dielectric paper and/or plastic foil is wetted by said additive substance immediately before the insertion of the roll in the capacitor housing.

9. An electrical capacitor as defined in claim 1, further comprising a liquid or solid filling substance, preferably a filling oil or cast resin or a mixture of the filling oil and cast resin, said additive substance being distributed in said liquid or solid filling substance so that upon closure of the capacitor housing the additive substance diffuses in the interspaces in the roll.

10. An electrical capacitor as defined in claim 1, wherein said additive substance is distributed in an impregnation substance of the capacitor.

* * * * *